(12) United States Patent
Binnig et al.

(10) Patent No.: US 7,180,847 B2
(45) Date of Patent: Feb. 20, 2007

(54) APPARATUS AND METHOD FOR STORING AND READING HIGH DATA CAPACITIES

(75) Inventors: Gerd K. Binnig, Wollerau (CH); Walter Haeberle, Waedenswil (CH); Peter Vettiger, Langnau am Albis (CH)

(73) Assignee: International Business Machines, Corporation, Armonk, NY (US)

( * ) Notice: Subject to any disclaimer, the term of this patent is extended or adjusted under 35 U.S.C. 154(b) by 694 days.

(21) Appl. No.: 10/669,851

(22) Filed: Sep. 23, 2003

(65) Prior Publication Data

US 2004/0257887 A1 Dec. 23, 2004

(51) Int. Cl.
*G11B 9/00* (2006.01)

(52) U.S. Cl. ..................................... 369/126
(58) Field of Classification Search ................ 369/126
See application file for complete search history.

(56) References Cited

U.S. PATENT DOCUMENTS 5,029,156 A * 7/1991 Kuehnle .................... 369/126
5,528,578 A    6/1996 Mraz ......................... 369/126
6,084,849 A *  7/2000 Durig et al. ................ 369/126
6,088,319 A *  7/2000 Gudesen ..................... 369/97
6,912,193 B2 * 6/2005 Cho et al. ................... 369/126
7,065,033 B2 * 6/2006 Onoe et al. ................. 369/126

FOREIGN PATENT DOCUMENTS

DE    3823010 A1    9/1989
JP    61133065 A *  6/1986

* cited by examiner

*Primary Examiner*—Thang V. Tran
(74) *Attorney, Agent, or Firm*—Richard M. Goldman

(57) ABSTRACT

In accordance with the present invention, there is provided an apparatus comprising a tape having an information layer on which information is storable in the form of perturbations, an array of probes that in function faces the tape such that the probes scan the surface of the tape, means for selectively forming the perturbations via the probes, means for detecting the presence of the perturbations via the probes, and drive means for moving the tape relative to the array of probes. The apparatus allows to store high data capacities at a small form factor.

20 Claims, 2 Drawing Sheets

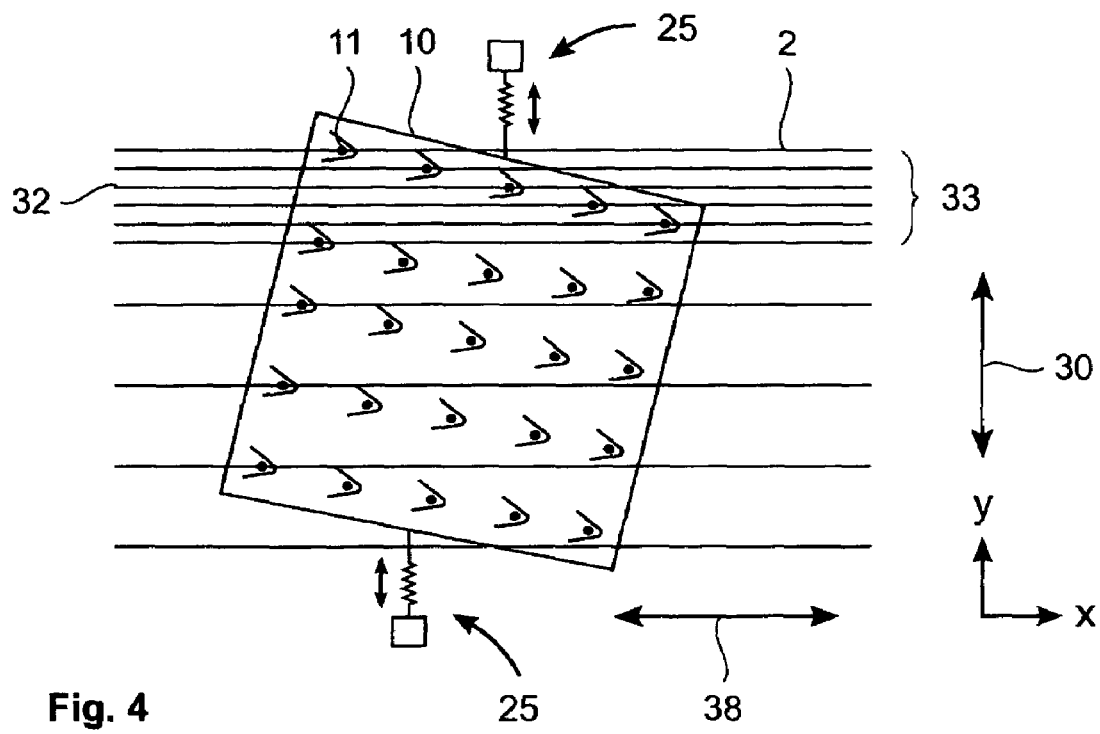
Fig. 4
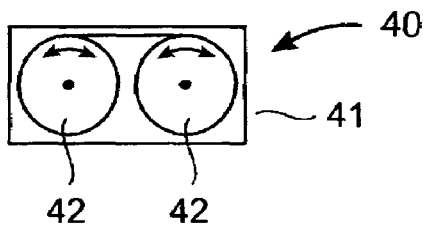
Fig. 5
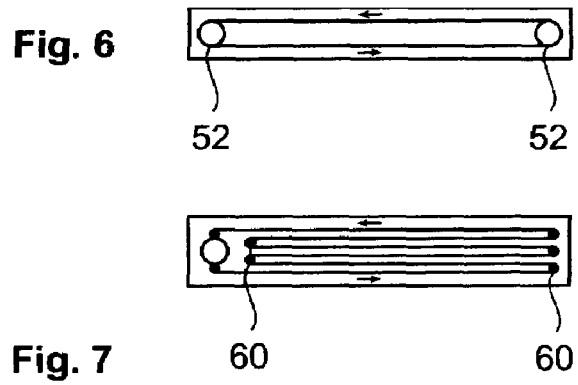
Fig. 6
Fig. 7

APPARATUS AND METHOD FOR STORING AND READING HIGH DATA CAPACITIES

TECHNICAL FIELD

The present invention relates to an apparatus and method for storing and reading information. More particularly the invention relates to a storage device providing a high data capacity at a small form factor.

BACKGROUND OF THE INVENTION

There are various techniques and devices for storing and archiving data and in particular for large amounts of data. The earliest storage devices were punched paper cards, which were used as early as 1804 to control silk-weaving looms. Later on, punched paper tapes were widely used for computing. Today, modern storage devices include all types of disk and tape drives. The capacity on the used recording medium is rather limited. Known are magnetically coated strips of plastic on which the data can be encoded. Storing data on tapes is considerably cheaper than storing data on disks. Tapes have usually storage capacities, ranging from a few hundred kilobytes to several gigabytes. However, the access to data on tapes is much slower than accessing data on disks.

For example, today's half-inch tapes, available as 9-track reels or as cartridges, have a capacity of 60 MB to 400 MB, quarter-inch cartridges (QIC tapes) have a capacity of 40 MB to 5 GB, and DAT (Digital Audio Tape) cartridges have a capacity of 2 GB to 24 GB, but they all require relatively expensive tape drives. Since most of the storage media bases on a magnetic recording technique, the storage media are not resistant against influencing magnetic fields. For mobile storage application a small form factor is important which with current devices and media is not achieved.

The development of scanning tunneling and atomic force microscopes has led to storage systems which make use of parallel local probes. An atomic force microscope (AFM)-based data storage concept is described in "The Millipede—More than one thousand tips for future AFM data storage", Vettiger et al., IBM Journal of Research and Development, Vol. 44 No. 3, May 2000.

There is a clear demand for single storage devices having storage capacity of more than 1 Terabit. It is further important for such a storage device, in particular when being used in a multimedia system where image frames need to be retrieved in a fast and consecutive manner, that very high data rates (read/write speed) can be achieved. Other important aspects are power consumption, overall weight and size, reliability, data security, and shock resistance (if used in portable computer systems).

It is an object of the present invention to overcome the disadvantages of the prior art. It is another object of the present invention to provide an apparatus and method for storing and reading high data capacities.

SUMMARY OF THE INVENTION

In accordance with the present invention, there is provided an apparatus comprising: a tape having an information layer on which information is storable in the form of perturbations; an array of probes that in function faces the tape such that the probes scan the surface of the tape; means for selectively forming the perturbations via the probes; means for detecting the presence of the perturbations via the probes; and drive means for moving the tape relative to the array of probes.

The apparatus is a recorder, whereby it also useable as a player. As a player, the means for selectively forming the perturbations are not necessary. The player is for the purpose of reading stored information only.

In a preferred embodiment of the present invention, the apparatus comprises movement or drive means for moving the tape relative to the array of probes which can be fixed in its position.

Thereby, each probe can scan its track. This can be achieved by a simple structure of the apparatus.

The drive means can move the tape stepwise in relation to the array of probes. By doing so, a reliable scan mode can be provided.

In a further embodiment, the apparatus comprises movement means for moving the array of probes relative to the tape and wherein this movement means generates an oscillating movement. This shows the advantage that each probe can scan a plurality of tracks on the tape's surface leading to a high density of storable data.

The probe array can be skewed relative to the direction of movement of the tape. This shows the advantage that each probe scans its track on the tape's surface.

The recorder comprises means for erasing the perturbations. In general, this can be the same means as for writing. This leads to a simple structure and array construction. For erasing the perturbations, a probe that touches a perturbation is shortly heated such that the surface melts at this place and the perturbation disappears.

The information layer of the tape can comprise a plurality of tracks depending on the number of probes. Each probe can scan several of the plurality of tracks, which leads to a high density of storable data.

The tape can be arranged within a cassette or a cartridge. Such tape storage unit can be handled and stored easily. The tape is protected and not exposed to direct influences of the environment, e.g. dust. However, also reel tapes can be used with the present invention.

The surface of the tape can comprise a polymer which can serve as the information layer. Such a surface can be easily achieved by known coating techniques.

The tape may comprise a base and a coating comprising the polymer. The base comprises a base layer comprising one of the materials: metal, milar, teflon, polymide. By having such a tape structure the information is storable on the base layer, as a first information layer, for example, by magnetic orientation and on the coating, as a second information layer, by indentations. In a further embodiment, the coating can be on both sides of the tape. In general, more than one information layer, i.e. two, three or more information layers can be used for storing information in any suitable way known in the art. For example, the information layer can be based on magnetic, magneto-optical, ferroelectric, charge injection, thermal techniques. Thermal assisted writing is such a thermal technique.

Because of the high data density that is storable on the coating, this layer is particular suited for storing pictures or movies while the base can be used for storing other information, e.g. sound, text, subtitles etc.

The tape can be endless. This has the advantage that the tape does not need to be changed. The length of the tape can be defined such that a daily recording is possible or several movies can be played in a defined sequence.

The tape may comprise means for mounting the tape in a plurality of nested loops. By arranging the tape in this kind the length of the tape within the cassette or cartridge can be extended compared to the well known two reel version.

DESCRIPTION OF THE DRAWINGS

Preferred embodiments of the invention are described in detail below, by way of example only, with reference to the following schematic drawings.

FIG. 4 shows a detailed top view of the apparatus in an oscillating mode.

FIG. 5 shows a side view of a cassette.

FIG. 6 shows an arrangement of the tape to an endless tape.

FIG. 7 shows another arrangement of the tape leading to a long version of the endless tape.

Figure 1:
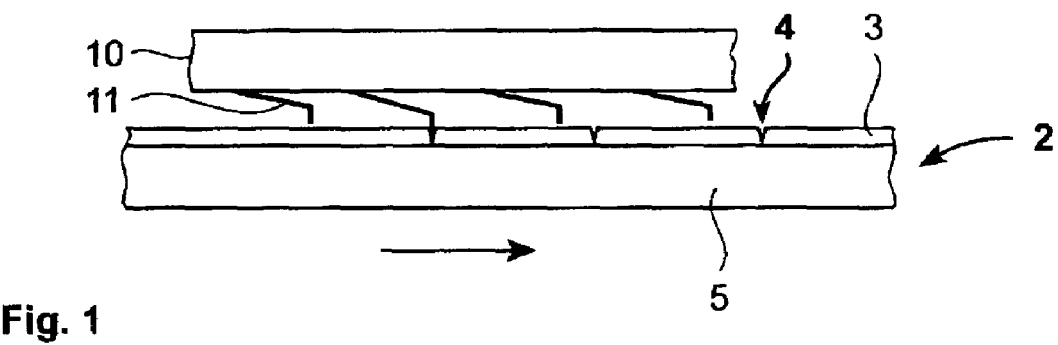
FIG. 1 shows a schematic side view of an apparatus according to the present invention.

The drawings are provided for illustrative purpose only and do not necessarily represent practical examples of the present invention to scale.

DETAILED DESCRIPTION

Before different embodiments of the present invention are described, the basic elements of the storage devices in accordance with the present invention are addressed.

Probes and Probe Arrays:

Probes are well known elements which are easy to make. Existing semiconductor and photoplastic fabrication processes can be employed. In essence, the techniques of micromachining are employed to create discrete probes and probe arrays. When dimensioning such probes, one has to take into account specific parameters of the material used as substrate in which the probes are formed. When properly designing such an array, it can be mass-produced at low cost and with high yield.

Usually, probes and probe arrays are made by etching away portions of a silicon substrate. This substrate is normally (100) oriented. (100) oriented silicon could for example be wet etched using ethyl diamine pyrocatechol or KOH solutions. Wet etching techniques are generally dependent on crystallographic orientation of the substrate, e.g. (100) oriented silicon shows a very low etch rate of the (111) plane, leading to a good etch stop along the (111) axis which generates well defined etch planes with 54.7° angles from (100). An alternative approach makes use of dry etching techniques, e.g. reactive-ion beam etching (RIE), chemically assisted ion beam etching, or microwave assisted plasma etching. Depending on process conditions, deep and anisotropic structures can be obtained leading to excellent dimensional control. Masks can be employed to define the structures to be etched. The probes used can have any shape that can be obtained by photolithography and etching. The cross-sectional shape could for example be rectangular, round, elliptical, or polygonal. For the present purpose cantilevers having a sharp tip are preferred as described above.

Also suited for the fabrication of probes are other semiconducting materials, like gallium arsenide, as reported in "dynamic Micromechnics on Silicon: Techniques and Devices", K. E. Petersen, IEEE Transactions on Electronic Devices, Vol. ED25, No. 10, 1978, pp. 1241–1249.

Usually a tip is used as local probe. Different techniques are known to produce such tips. They can for example be made by isotropic wet or dry etching in combination with the oxidation of a single crystal material such as silicon. The following materials are well suited for making local probes and local probe arrays: tungsten, tungsten alloy, platinum, molybdenum, silicon (doped or undoped), doped diamond, any refractory metal, or conductive ceramics, to name some. The combination of wet or dry etching and liftoff plus oxidation leads to very sharp pointed cones. The sharper the tips are, the denser information on a storage medium can be stored, i.e. the higher the storage capacity of a storage device will be. The probes can be coated with an appropriate metal such as gold, for example. In U.S. Pat. No. 5,204,581 it is described in detail how to make tips or arrays of tips which can be used in connection with the present invention. An example for the microfabrication of a tip is also disclosed in the article "Silicon cantilevers and tips for scanning force microscopy", J. Brugger et al., Sensors and Actuators A, Vol. 34, 1992, pp. 193–200. It is important to note that by means of batch fabrication local probe arrays can be made in a reproducible and cheap manner.

Driving circuitry: Certain means, including driving circuitry, preamplifiers, and an appropriate wiring for reading and writing information need to be applied. In order to handle the high data rates resulting from the multiplexing of multiple parallel channels, one needs to provide a very fast electronic circuitry. To make these means one can employ existing tools and processes common to the semiconductor and solid-state industries. The driving electronics as well as the probes call for circuitry like that used in scanning tunneling microscopy (STM) and atomic force microscopy (AFM) systems, albeit shrunken to extremely small size. The miniaturization is mandatory to obtain short interconnections, high speeds, and less power for circuitry.

The application of an atomic force microscope (AFM)-based data storage concept including cantilever structures is described in "The Millipede—More than one thousand tips for future AFM data storage", Vettiger et al., IBM Journal of Research and Development, Vol. 44 No. 3, May 2000, the content of which is incorporated herein by reference.

Storage Media:

A storage medium in accordance with the present invention is a tape or a tape-like storage media having one or more information layers. The media which can be used in connection with the present invention can be grouped as follows. In general, perturbations can be formed in the medium, or removed therefrom by locally creating or altering the topographic features or composition; altering the crystalline phase; creating or destructing electronic states; filling or emptying existing electronic states; creating or altering domain structures or polarization states; creating or altering chemical bonds. Even a combination of media within the tape can be used. The probes will then be adapted accordingly, in order to use the respective media.

In addition to the above examples, any combination of physical or chemical effects can be used. A good and detailed description of the different media suited is given in U.S. Pat. No. 5,307,311.

Another approach, not explicitly mentioned in the above US patent, would be to use a very soft, wax-like material, polymer, or liquid crystal in which perturbations are created either by locally heating the material, or by imprinting patterns or pits by moving the probe up and down. By heating up the material so as to melt it locally, or over a larger area, e.g. one storage field, one could clean it up (erase). The heating could be achieved electrically, e.g. by local heating element such as resistors, or by means of a laser beam. It is for example possible to provide each local probe array with a heat source, e.g. a resistor, such that the warm probe generates perturbations in the storage medium. By means of heating elements integrated into said storage medium, or placed on the backside thereof, whole storage sections can be erased at once.

Perturbations can also be generated by employing the tunneling effect in order to move and remove atoms. This approach, according to which the information is stored in the form of patterns of atoms adsorbed on the surface of a storage medium, is described in U.S. Pat. No. 4,575,822. The probe is maintained at tunneling distance from the medium to remove individual atoms from the medium for writing, and to detect variations of the tunneling current caused by the presence or absence of atoms in scanned locations for reading.

Turning now to the figures, in which the same reference numbers are used to denote the same or like parts.

FIG. 1 shows a schematic side view of an apparatus according to the present invention in operation. The apparatus that here is a recorder is able to write and read information in form of indentations 4, and also to erase these by means of heating and cooling (not shown). The indentations 4 are considered as perturbations 4, but in general under the word perturbation any suitable form of storing information in a material is understood. The recorder comprises an array of probes 10, whereby each probe 11 scans over a tape 2. The array of probes 10 can be designed in a one or two dimensional way. The tape 2 comprises an information layer 3 that here forms the surface of the tape 2. The tape 2 has a base 5 comprising a base layer 5 on which the information layer 3 is coated. The surface comprises a polymer and the base layer 5 can be made of any suitable material, e.g. metal, milar, teflon, or polymide. The information layer 3 shows perturbations 4, whereby in the figure one of the probes 11 creates a third perturbation 4. The tape 2 moves into the direction of the arrow. Several modes of operation are possible as described below.

Also possible is to have the tape coated on both sides (not shown). For using that, another probe array can be arranged properly on the respective side.

Furthermore, the base layer 5 or further additional layers (not shown) can be used for storing information simultaneously. This shows the advantage that huge amounts of data can be stored within a small region. For example, while the base layer 5 stores high quality sound information by magnetic orientations, the surface 3 stores picture or movie information by indentations.

Several known techniques for storing information can be applied simultaneously, while the array of probes 10 is adapted to these techniques.

Figure 2:
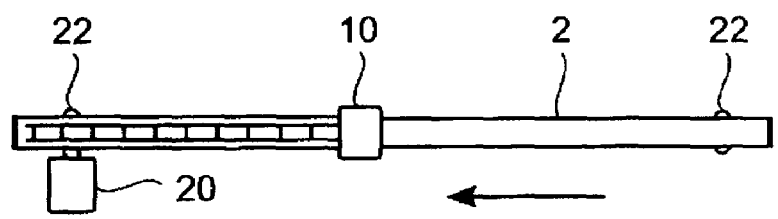
FIG. 2 shows a top view of the apparatus in a stepwise mode.

FIG. 2 shows a top view of the recorder in a step by step mode. The array of probes 10 is arranged as a write/read/erase head above the tape 2 which moves into the direction indicated by the arrow. The tape 2 is driven by drive means 20 as they are known in the art. The tape 2 is rolled up on reels at an axis 22 on both sides. Beside a continuous mode, i.e., the tape 2 moves continuously underneath the scanning probes 11, a stepwise mode as shown in FIG. 2 can be applied. For that, the array of probes 10 moves up and down in defined intervals. On one hand, if the array of probes 10 is up, then the tape 2 moves forward a defined length. On the other hand, if the array of probes 10 is down, the movement of the tape 2 stops. By using the array of probes 10 information is written, read, or erased by the respective probes 11. Each probe 11 can be controlled separately. The array of probes 10 can also be kept at its position without up- and down movement while the tape 2 is in movement. The size of the array of probes 10 is related to the step length, in that each step is defined by the array size.

Figure 3:
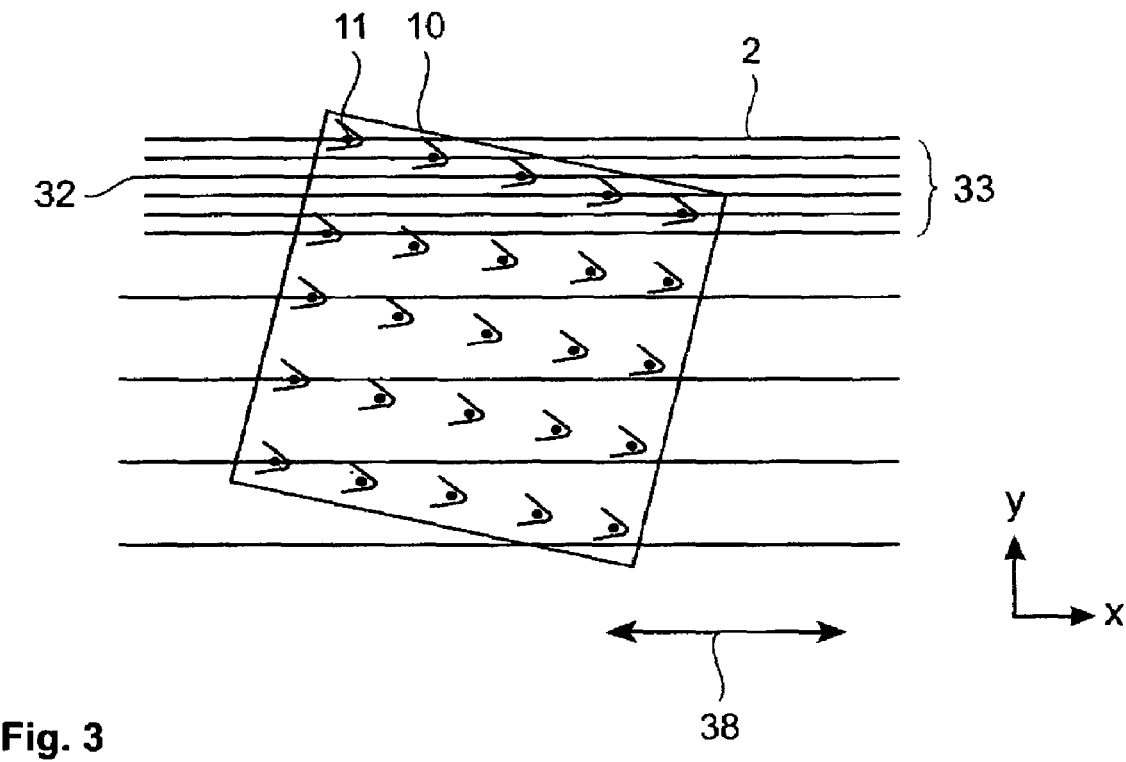
FIG. 3 shows a detailed top view of the apparatus.

FIG. 3 shows a detailed top view of the recorder where the head or the array of probes 10 is arranged in a defined position. The array of probes 10 is skewed relative to the direction of movement of the tape 2. The array of probes 10 is depicted in a through view, whereby underneath the tape 2 is moveable as indicated by the arrow 38. In general, the array of probes 10 has an arrangement of probes 11 in parallel rows. The probes 11 are arranged in defined distances where here each probe 11 is arranged to its track 32 as it is shown in the upper part of the FIG. 3. For the sake of clarity not all possible tracks 32 are shown. As can be seen, the array of probes 10 is skewed relative to the direction of movement of the tape 2. In other words, the array of probes 10 is arranged tilted with respect to the moving direction of the tape 2. This leads advantageously to a higher track density. The tape 2 comprises a plurality of tracks 32. Each row of probes 11 corresponds to a row-track 33. In total five row-tracks 33 are shown in the figure. The dimension and structure of the recorder are a question of design and can be varied by the skilled person.

FIG. 4 shows a detailed top view of the recorder as described with reference to FIG. 3 where here the head or the array of probes 10 operates in an oscillating mode. In addition to FIG. 3, the array of probes 10 is mounted to a movement means 25, that here is a spring means 25, on both sides. The spring means 25 allows the array of probes 10 to oscillate approximately perpendicular to the direction of movement of the tape 2. The direction of the oscillation is indicated by the arrow 30. In this embodiment, besides the plurality of tracks 32 so-called sub tracks can be used (not shown in the figure). In other words, between the single tracks 32, multiple sub tracks are reachable by and assigned to each probe 11. The sub tracks are used by each probe 11 by the oscillation generated by the movement means 25. This allows very small track separation and leads advantageously to very high track densities.

In general, several modes of operation are applicable as described in the following whereby also a combination of the modes is possible.

As described with reference to FIG. 2, a stepwise mode can be applied. For that the array of probes 10 has a fixed position while the tape 2 moves stepwise for new track fields.

A continuous mode of scanning can be applied. For that the tape 2 moves relative to the array of probes 10. The array of probes 10 scans thereby in X-direction while the tape 2 is in motion.

The array of probes 10 scans in Y-direction while X-scanning is achieved by the motion of the tape 2.

The array of probes 10 operates in a so-called X/Y pitch scan mode as depicted in FIG. 4. That means, the array of probes 10 oscillates approximately perpendicular to the direction of movement of the tape 2 by using the spring means 25. This mode has the advantage that information can not only be stored on the tracks 33 itself but also in-between the tracks 33, i.e. on the sub tracks, which leads to a much higher density of storable data.

FIG. 5 shows a side view of a tape storage unit 40 that here is a cassette 40. Such a cassette 40 is easy to handle and is depicted nearly in real dimensions. The cassette 40 comprises a housing 41 and two pivotally mounted reels 42 on which the tape 2 is rolled up. At least 3 m of tape 2 can be stored on the cassette 40. Moreover, the cassette 40 comprises an opening (not shown) for the access of the array of probes 10. The reels 42 have grip means (not shown) as they are known in the art for interference with the driving means 22.

FIG. 6 shows an arrangement of the tape 2 in order to provide an endless tape. For that, rollers 52 are arrange inside the cassette 40. This arrangement is suitable for playing movies or sequences in an endless fashion.

FIG. 7 shows another arrangement of the tape 2 leading to a long version of the endless tape 2. For that, guide rollers 60 as they are known in the art are mounted such that the tape 2 is guided in a plurality of nested loops.

Now that the invention has been described by way of embodiments, various modifications and improvements will occur to those of skill in the art.

The invention claimed is:

1. A recorder comprising:
   a tape having an information layer on which information is storable in the form of perturbations;
   an array of cantilevers with tips that in function faces the tape such that the tips scan the information layer of the tape;
   means for selectively forming the perturbations via the tips;
   means for detecting the presence of the perturbations via the tips; and
   drive means for moving the tape relative to the array of cantilevers with tips.

2. Recorder according to claim 1, wherein the array of cantilevers with tips is skewed relative to the direction of movement of the tape.

3. Recorder according to claim 1, wherein the tape comprises several information layers.

4. Recorder according to claim 1, wherein the information layer comprises a polymer.

5. Recorder according to claim 1, wherein the information layer comprises a plurality of tracks.

6. Recorder according to claim 5, wherein each cantilever of the array of cantilevers with tips scans several of the plurality of tracks.

7. Recorder according to claim 1, wherein the drive means moves the tape stepwise in relation to the array of cantilevers with tips.

8. Recorder according to claim 1 further comprising movement means for moving the array of cantilevers with tips relative to the tape.

9. Recorder according to claim 8, wherein the movement means generates an oscillating movement.

10. Recorder according to claim 1 further comprising means for erasing the perturbations.

11. A player comprising:
    a tape having an information layer on which information is storable in the form of perturbations;
    an array of cantilevers with tips that in function faces the tape such that the tips scan the surface of the tape;
    means for detecting the presence of the perturbations via the tips; and
    drive means for moving the tape relative to the array of cantilevers with tips.

12. A tape storage unit comprising a tape having an information layer on which information in form of perturbations is storable, the tape storage being useable with a recorder comprising: (i) a tape having an information layer on which information is storable in the form of perturbations; (ii) an array of cantilevers with tips that in function faces the tape such that the tips scan the information layer of the tape; (iii) means for selectively forming the perturbations via the tips; (iv) means for detecting the presence of the perturbations via the tips; and (v) drive means for moving the tape relative to the array of cantilevers with tips.

13. The tape storage unit according to claim 12 being a cassette.

14. The tape storage unit according to claim 12, wherein the tape comprises a base and a coating comprising a polymer.

15. The tape storage unit according to claim 14, wherein the base comprises a base layer comprising one of the materials: metal, milar, teflon, polymide.

16. The tape storage unit according to claim 15, wherein the information is storable on the base layer by magnetic orientation and on the coating by indentations.

17. The tape storage unit according to claim 12, wherein the tape is endless.

18. The tape storage unit according to claim 12 further comprising means for mounting the tape in a plurality of nested loops.

19. A method for storing and reading information comprising:
    facing an array of cantilevers with tips to a tape, whereby information in form of perturbations being storable on an information layer of the tape;
    moving the tape relative to the array of cantilevers with tips;
    forming and erasing the perturbations by selectively applying a tip of the array of cantilevers with tips; and
    detecting the presence of the perturbations by detecting means.

20. Method according to claim 19, whereby the step of facing the array of cantilevers with tips to a tape further comprises moving the array of cantilevers with tips relative to the tape.

* * * * *